(12) United States Patent
Magnusson et al.

(10) Patent No.: US 9,620,981 B2
(45) Date of Patent: Apr. 11, 2017

(54) METHOD AND SYSTEM FOR CONTROLLING CHARGING OF AN ENERGY STORAGE DEVICE

(71) Applicant: VOLVO CAR CORPORATION, Gothenburg (SE)

(72) Inventors: Anders Magnusson, Uppsala (SE); Mats Nilsson, Kungsbacka (SE)

(73) Assignee: Volvo Car Corporation, Gothenburg (SE)

( * ) Notice: Subject to any disclaimer, the term of this patent is extended or adjusted under 35 U.S.C. 154(b) by 386 days.

(21) Appl. No.: 14/515,875

(22) Filed: Oct. 16, 2014

(65) Prior Publication Data

US 2015/0115874 A1   Apr. 30, 2015

(30) Foreign Application Priority Data

Oct. 24, 2013  (EP) .................................. 13005076

(51) Int. Cl.
| | |
|---|---|
| *H02J 7/00* | (2006.01) |
| *B60L 3/00* | (2006.01) |
| *B60L 3/04* | (2006.01) |
| *B60L 11/18* | (2006.01) |

(52) U.S. Cl.
CPC .............. *H02J 7/007* (2013.01); *B60L 3/00* (2013.01); *B60L 3/0069* (2013.01); *B60L 3/04* (2013.01); *B60L 11/1816* (2013.01); *H02J 7/0052* (2013.01); *B60L 2230/12* (2013.01); *B60L 2240/80* (2013.01); *Y02T 10/7005* (2013.01); *Y02T 10/7088* (2013.01); *Y02T 90/121* (2013.01); *Y02T 90/14* (2013.01)

(58) Field of Classification Search
CPC ....................................................... H02J 7/007
USPC .................................................... 320/107, 109
See application file for complete search history.

(56) References Cited

U.S. PATENT DOCUMENTS

| | | | | |
|---|---|---|---|---|
| 2011/0204849 | A1* | 8/2011 | Mukai ................... | B60L 3/0069 320/111 |
| 2012/0139490 | A1* | 6/2012 | Ishii ..................... | B60L 11/1816 320/109 |
| 2013/0127415 | A1* | 5/2013 | Ohtomo ................. | B60L 3/003 320/109 |

FOREIGN PATENT DOCUMENTS

EP          2602909          6/2013

OTHER PUBLICATIONS

Extended European Search Report for EP 13005076.8, Completed by the European Patent Office, Dated Mar. 12, 2014, 8 Pages.

\* cited by examiner

Primary Examiner — Samuel Berhanu
Assistant Examiner — Tessema Kebede
(74) Attorney, Agent, or Firm — Brooks Kushman P.C.

(57) ABSTRACT

The disclosure relates to a method for charging an energy storage device in a vehicle using a power supply, the method comprising: determining a first voltage output from the power supply; starting charging; determining a second voltage output from the power supply; determining a first voltage difference based on a difference between the second voltage and the first voltage; after a predetermined time, aborting charging; determining a third voltage output from the power supply; starting charging; determining a fourth voltage output from the power supply; determining a second voltage difference based on a difference between the fourth voltage and the third voltage; determining a deviation value based on a difference between the second difference and the first difference; and based on the deviation value, controlling a charging parameter.

15 Claims, 3 Drawing Sheets

METHOD AND SYSTEM FOR CONTROLLING CHARGING OF AN ENERGY STORAGE DEVICE

CROSS-REFERENCE TO RELATED APPLICATIONS

This application claims foreign priority benefits under 35 U.S.C. §119(a)-(d) to European Application No. EP 13005076.8 filed Oct. 24, 2013, the disclosure of which is incorporated herein by reference in its entirety.

TECHNICAL FIELD

The present disclosure relates to charging of an energy storage device. In particular, the present disclosure relates to charging of an energy storage device of an electrical or hybrid vehicle.

BACKGROUND

Electric and hybrid vehicles have recently become a more common sight on roads worldwide. They have one thing in common and that is they all require a large and powerful rechargeable battery. Despite the size of such batteries mounted in e.g. electric vehicles, they need to be recharged almost every day, depending on how frequently and how far the vehicle is driven.

The power required from a power source in order to recharge a rechargeable battery of an electric vehicle is substantial. A concern is the risk of a highly resistive point or connection such as e.g. a faulty connection, a broken cable or a loose connection somewhere along the electrical path from the power supply to the energy storage device which may be a hazard for a charging system. An increased electrical resistance together with the high currents in the charging system causes an increase in temperature and may thus become a fire hazard, or may damage components of the charging system. Furthermore, an increased electrical resistance of e.g. a charging cable may cause the power supply to saturate its output which puts unnecessary strain on the power supply.

For conventional charging systems there is commonly a dedicated cable with an integrated temperature sensor for detecting an increased temperature. A charging cable comprising a temperature sensor is disclosed in e.g. US2011/0204849. In the cable disclosed in US2011/0204849 a temperature sensor measures the temperature in the cable at, e.g. an end of the cable close to a power outlet.

However, such cables involve high complexity and are relatively expensive. Furthermore, an increased resistance may be due to e.g. heating of components such as cables of the system other than the charging cable, or any other highly resistive connection or defect. Such a defect (or heating or connection) may be present anywhere along an electrical path from a power supply to a battery and may thus be difficult to accurately detect with a temperature sensor integrated in the cable. Therefore, it is desirable to more accurately ensure a safe charging process.

SUMMARY

In view of the above, it is a general object of the present disclosure to provide an improved method for charging using any cable suitable for charging of an electric or hybrid vehicle.

According to a first aspect it is therefore provided a method for charging an energy storage device in a vehicle using a power supply, the method comprising the steps of: determining a first value indicative of a first voltage level output from the power supply; starting charging of the energy storage device using the power supply; determining a second value indicative of a second voltage level output from the power supply; determining a first voltage difference based on a difference between the first value and the second value; after a predetermined time, aborting charging; determining a third value indicative of a third voltage level output from the power supply; starting charging of the energy storage device using the power supply; determining a fourth value indicative of a fourth voltage level output from the power supply; determining a second voltage difference based on a difference between the third value and the fourth value; determining a deviation value based on a difference between the first voltage difference and the second voltage difference; and based on the deviation value, controlling a charging parameter.

A value indicative of a voltage output level may be e.g. a measured voltage value or an electrical current value. The difference is determined by subtracting the first value from the second value or the second value from the first value. The deviation value is indicative of a power loss caused by a resistance of e.g. a faulty, discontinuous, interrupted, or incomplete connection anywhere along the electrical path from the power supply to the energy storage device, or the power loss may be caused by a faulty cable, for example having a defect on a conductor of the cable, or a cable that may be badly fitted with the power inlet or outlet. Thus, the power loss may be caused by any highly resistive point along the electrical path from the power supply to the energy storage device. A deviation value may further be a resistance value determined from a voltage value and an electrical current value.

The present disclosure is based on the realization that a power loss measured at the power supply is indicative of an electrical resistance in the electrical path connected to the output of the power supply. For example, a resistance of a poor connection is higher than in a proper connection. The disclosure is further based on the realization that by determining a change in the power loss by determining the difference between the power losses at two different times, an indication of the quality of the electrical path between e.g. a power supply and a battery may be obtained. For example, if the power loss increases substantially over time there may be a higher risk of e.g. a fire in a power outlet as compared to only a slight increase of power loss over time. In case the power loss has increased substantially, a charging parameter such as charging voltage, charging current, charging power, etc may advantageously be controlled to reduce the power loss.

According to one embodiment of the disclosure, if the deviation value exceeds a first predetermined threshold value, a charging current provided from the power supply to the energy storage device may be reduced. The deviation value may be indicative of a power loss. If the deviation value is determined to be too high, i.e. such that it exceeds a predetermined first value, it is advantageous to reduce the charging current provided from the power supply in order to reduce the risk of e.g. a fire somewhere along the electrical path from the power supply to the energy storage device. In the case of the deviation value exceeding the first value, where the first value being relatively low, charging of the energy storage device may continue with the reduced charging current.

In one embodiment of the disclosure, the charging current provided may be reduced proportionally to the deviation value. For example, if the deviation value exceeds the first threshold value by a first amount the charging current may be reduced by an amount depending on the first amount. The amount may for example be percentage. For example, if the deviation value exceeds the first value by 10%, the charging current may be reduced by for example 20%, 10%, 5% or another percentage depending on a proportionality constant being 2, 1, or 0.5 respectively according to the example. The proportionality constant may have any other value suitable for the specific situation. The amount as described above may further be related to other values than a percentage. For example, the amount may be related to a voltage, a current, and/or an electrical resistance, etc.

According to one embodiment of the disclosure, the charging of the energy storage device may advantageously be aborted if the deviation value exceeds a second predetermined threshold value, the second threshold value being larger than the first threshold value. It may be advantageous in some situations to abort charging of the energy storage device. For example, in a situation where a risk of fire is expected to be relatively high, it is preferably determined that charging of the energy storage device should be aborted. For example, there may be a highly resistive defect somewhere on the charging cable. When passing a charging current through such a highly resistive defect, an increased power loss and an increased temperature may occur at the defect, thus leading to an increased risk of a fire or damage on the charging system. The second threshold value is larger than the first threshold value, thus, in a first instance where only the first threshold value is exceeded and not the second, the charging current is reduced and in a second instance where the second threshold value is exceeded the charging is aborted. Accordingly, the risk may be considered to be higher if the second predetermined value is exceeded than if only the first predetermined value is exceeded.

According to one embodiment of the disclosure, the method may further comprise determining a temperature value indicative of a temperature of a charging cable connected between the power supply and the energy storage device. Measuring the temperature enables an additional indication of an increased power loss in the charging system. For example, a faulty connection or a damaged conductor in the cable may cause an increased electrical resistance which causes an increased temperature of a faulty charging cable and thus an increased power loss in the charging system. By monitoring both the deviation value and the temperature, a safer charging method may be obtained.

According to one embodiment of the disclosure, if the temperature value exceeds a first predetermined threshold temperature value, a charging current provided from the power supply to the energy storage device may be reduced. A somewhat increased temperature may be an indication of e.g. a damaged conductor. Thus reducing the charging current may reduce the risk associated with continuing the charging of the energy storage device. For example, a damaged conductor of a charging cable may be fine for finishing an ongoing charging process if the charging current is reduced. The charging cable may then be replaced or repaired after charging has completed.

According to one embodiment of the disclosure, charging of the energy storage device may be aborted if the temperature value exceeds a second predetermined temperature threshold value, the second temperature threshold value being larger than the first temperature threshold value.

Thus, if the temperature of the charging cable reaches a certain, relatively high, temperature, the charging is aborted. The temperature determination may be used in various combinations with other types of power loss determinations described herein. For example, a certain combination of temperature increase and power loss value may be an indication that charging should be aborted or that a charging current should be reduced.

According to one embodiment of the disclosure, the method may further comprise determining a third voltage difference value indicative a voltage between an electrical neutral lead of the power supply and an electrical ground during charging, wherein if the third difference exceeds a third predetermined threshold value, aborting charging of the energy storage device. An electrical neutral lead is a lead intended to hold earth potential. However, if it does not hold earth potential there will be a voltage between electrical ground, which holds earth potential, and the electrical neutral lead. If the third voltage difference value exceeds the third predetermined threshold value it may be an indication of a poor connection such as e.g. a damaged conductor or a faulty cable. By also monitoring the third voltage difference value, a more accurate and safe system for charging is obtained. Furthermore, the electrical neutral may be measured at other locations than at the power supply, for example in the charging system in the vehicle. Moreover, electrical ground may be electrically connected to in the vehicle and/or at the power supply.

According to one embodiment of the disclosure, the predetermined time after which charging is aborted may be in the range of 1-60 minutes. The time may for example be determined based on the nature of the cause for aborting charging.

According to one embodiment of the disclosure, the method may be repeated at predetermined time interval. The method may be repeated in order to obtain an updated evaluation of whether the charging should be aborted of if a charging current should be reduced. The method may for example be repeated continuously or it may be repeated every e.g. 1, 2, 5, 10, 20, 30, 60 minutes, or similar, depending on the time for performing the method.

According to a second aspect of the present disclosure there is provided a system for charging an energy storage device with an external power supply, the system comprising: a control unit arranged or configured to receive a current from the power supply, the control unit comprising a measuring unit for determining a value indicative of a voltage level output from the power supply; and a relay unit arranged or configured to receive the current from the power supply and, depending on a control signal received from the control unit, configured to control a supply of the current from the power supply to the energy storage device; wherein the control unit is configured to: in the measuring unit, determine a first value indicative of a voltage level output from the power supply; start charging of the energy storage device using the power supply; in the measuring unit, determine a second value indicative of a second voltage level output from the power supply; determine a first voltage difference based on a difference between the second value and the first value; after a predetermined time, abort charging; in the measuring unit, determine a third value indicative of a third voltage level output from the power supply; start charging of the energy storage device using the power supply; in the measuring unit, determine a fourth value indicative of a fourth voltage level output from the power supply; determine a second voltage difference based on a difference between the fourth voltage level and the third voltage level; determine a deviation value based on a difference between the first voltage difference and the second voltage difference; and based on the deviation value, control a charging parameter.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to one embodiment of the disclosure, the system may further comprise a temperature sensor arranged or configured to determine a temperature value indicative of a temperature of the charging cable, wherein if the temperature value exceeds a first predetermined temperature value, the control unit is configured to reduce a charging current.

According to one embodiment of the disclosure, the control unit may be configured to abort charging if the temperature value exceeds a second predetermined temperature value.

According to one embodiment of the disclosure, the control unit may be further configured to, if the deviation value exceeds a first predetermined threshold value, reduce a charging current provided from the power supply to the energy storage device.

According to one embodiment of the disclosure, the control unit may be further configured to, if the deviation value exceeds a second predetermined threshold value, control the relay unit such that charging of the energy storage device is aborted, wherein the second threshold value is larger than the first threshold value. Charging may me aborted by controlling the charging current with the control unit. In other words, the control unit may be configured to abort charging of the energy storage device.

Further effects and features of this second aspect of the present disclosure are largely analogous to those described above in connection with the first aspect of the disclosure.

Further features of, and advantages with, the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail, with reference to the appended drawings showing a currently preferred embodiment of the disclosure, wherein.

DETAILED DESCRIPTION

As required, detailed embodiments of the present disclosure are disclosed herein. However, it is to be understood that the disclosed embodiments are merely exemplary of the disclosure that may be embodied in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

In the following description, the present disclosure is mainly described with reference to a method for charging a battery of an electrical or hybrid vehicle using an external power supply supplying a charging current to the energy storage device, and to a charging system in such a vehicle.

Figure 1:
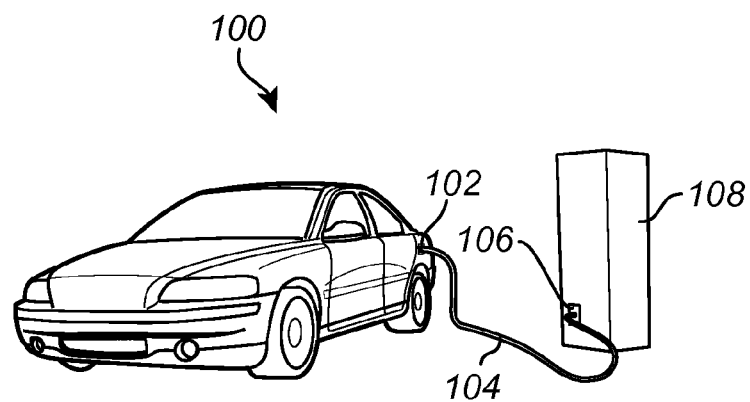
FIG. 1 schematically shows an exemplary application for an exemplary embodiment of a system and for a method according to an embodiment of the disclosure.

FIG. 1 illustrates an exemplary application of the present disclosure. In, FIG. 1, an electric vehicle 100 is connected at its power inlet 102 via a charging cable 104 to an external power supply 106. The external power supply 106 may for example be located at a charging station 108 for electric vehicles or it may be a conventional domestic power outlet. The power supplied by the power supply may for example be 220 V at 50 Hz or 110 V at 60 Hz via a one-phase output or a three-phase output. Moreover, the charging cable 104 can be a regular power cord or a dedicated charging cord.

Figure 2:
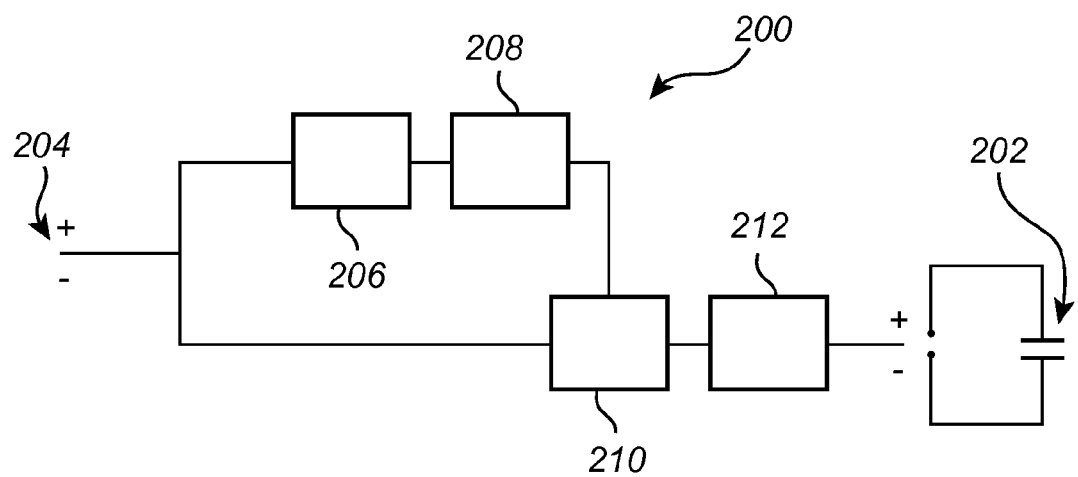
FIG. 2 schematically shows an exemplary embodiment of the system according to the present disclosure.

FIG. 2 schematically illustrates an embodiment of the present disclosure comprising a charging system 200 in a vehicle charging an energy storage device 202 of an electrical or hybrid vehicle 100 using an external power supply 106. In FIG. 2, the charging system 200 comprises an analog-to-digital converter 206 (ADC), a control unit in the form of a microprocessor 208, a relay 210 for controlling the supply of charging current to the energy storage device 202, and a rectifier 212 for rectifying the current before it reaches the energy storage device 202. During charging of the energy storage device 202, a charging current is provided by an external power supply at a power inlet 204. A portion of the charging current passes the ADC 206 which may comprise a resistance ladder for down-converting the amplitude of the charging current before it reaches the microprocessor 208. The microprocessor 208 controls the relay 210 and thus the supply of current to the energy storage device 202. Furthermore, the microprocessor 208 is configured to determine a voltage value of the voltage at provided from the external power supply, and to determine a voltage difference between a first and a second voltage value as will be described with reference to FIG. 3 and FIG. 4. The majority of the current is provided from the power inlet 204 to the relay 210, and only a smaller portion is routed to the microprocessor 208. Here, the energy storage device is a rechargeable battery 202 of a vehicle. The external power supply 106 may for example be located at a charging station 108 for electric vehicles or it may be a conventional domestic power outlet.

Figure 3:
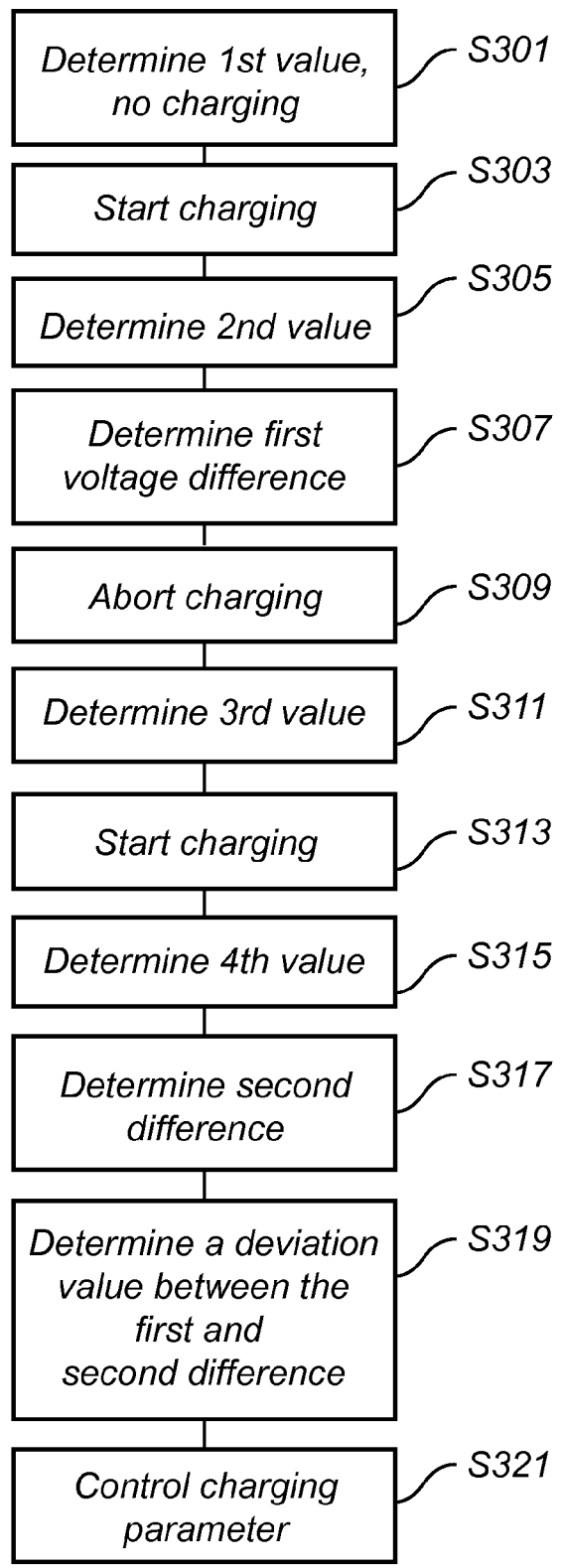
FIG. 3 is a flow-chart illustrating a method according to an exemplary embodiment of the disclosure.

FIG. 3 shows a flow-chart describing an exemplary method according to an embodiment of an aspect of the disclosure. In a first step S301, a first value indicative of a first voltage value is determined. For example, the control unit 208 measures the voltage output of a power supply, for example a power network arranged or configured to supply 220 V at 50 Hz to the energy storage device 202 via a charging cable 104. In the first step S301 charging of the energy storage 202 device has not begun. In a following step S303, charging of the energy storage device is started. The charging current is provided from the power network via the charging cable 104. While charging, that is, when the power network is providing the charging current to the energy storage device 202, a second value indicative of a second voltage output from the power network is determined in subsequent step S305. In subsequent step S307 a first voltage difference is determined as a difference between the second value and the first value. After a predetermined time has elapsed, starting from when charging was started in step S303 and after the second value was determined, charging is aborted in step S309. In subsequent steps S311-S317 a second voltage difference is determined with steps analogues to steps S301-S307. The first and second voltage differences are indicative of a power loss at the corresponding time instance (thus a first and a second power loss). Thereby, it is possible to determine an increase/reduction in the power loss by determining a difference between the first and the second voltage differences. Thus, in step S319, a difference between the first and second voltage differences is determined as a deviation value. Depending on the deviation value, it is determined to control a charging parameter in step S321.

Figure 4:
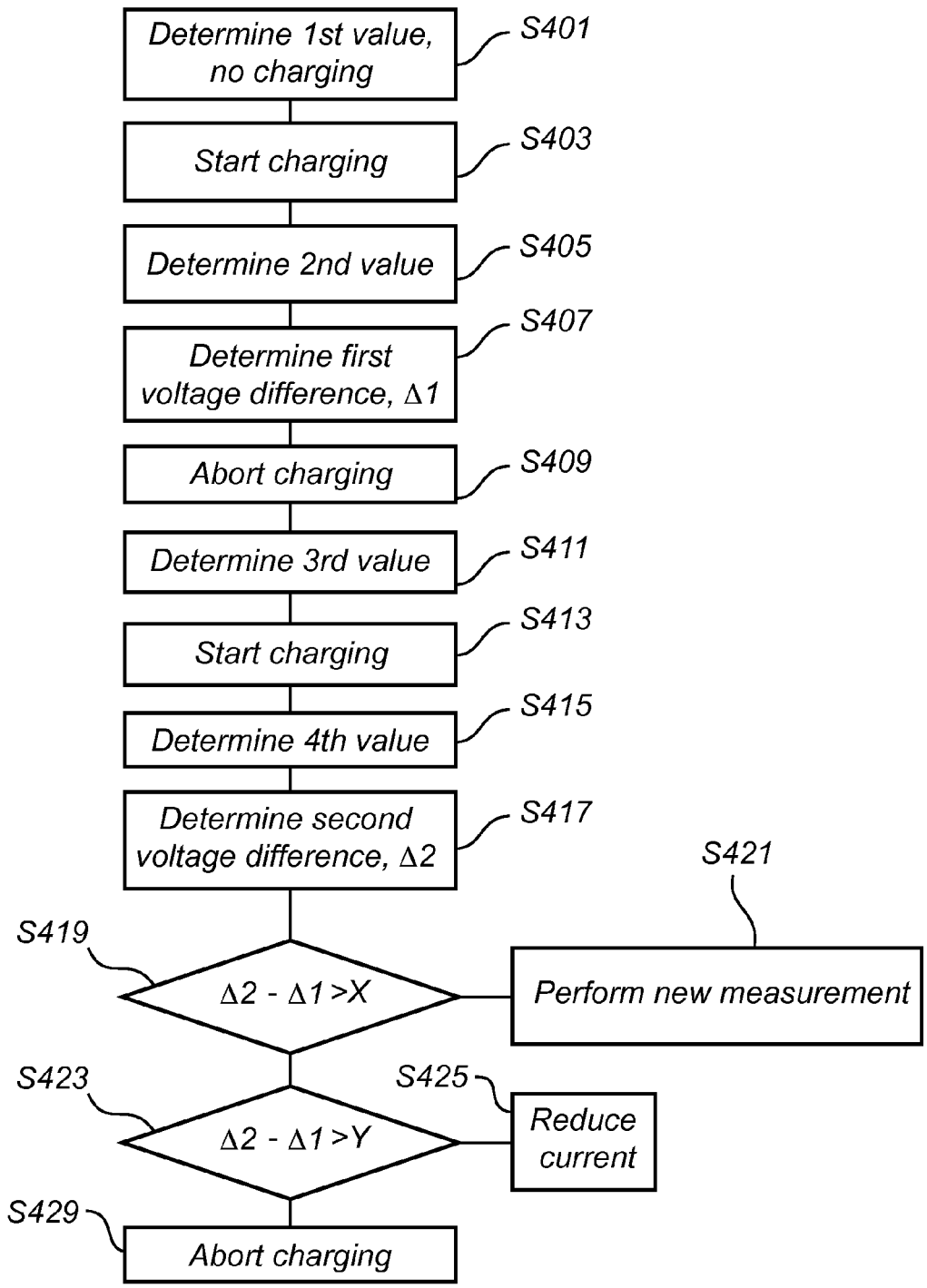
FIG. 4 is a flow-chart illustrating a method according to an exemplary embodiment of the disclosure.

FIG. 4 shows a flow-chart describing an exemplary method according to an embodiment of an aspect of the disclosure. In FIG. 4, steps S401-S417 are analogous with steps S301-S317 in FIG. 4 and will not be further explained with reference to FIG. 4. In step S419, the deviation value being the difference between the second voltage difference and the first voltage difference (Δ2−Δ1), is compared to a first predetermined value X. If it is determined that the deviation value has not increased more than the first predetermined value X, i.e. if the deviation value being the difference between the first and second differences is smaller than X (Δ2−Δ1<X), the above steps of determining the second difference which is compared to the previously determined first difference is restarted S421. However, if it is determined that the deviation value is larger than or equal to the first predetermined value X (Δ2−Δ1≥X), i.e. the deviation value has increased more than X, then the deviation value is compared to a second predetermined value Y in step S423. If it is determined in step S423 that the difference (Δ2−Δ1) is smaller than the second predetermined value Y (Δ2−Δ1<Y), then the charging current provided from the power network to the energy storage device is reduced S425 and a new measurement S427 according to the above steps is performed in order to again determine a second voltage difference which is compared to the previously determined first difference. If it is determined that that the deviation value is larger than or equal to the second predetermined value Y (Δ2−Δ1≥Y), the charging is aborted in step S429. In such case the deviation value is concluded to be too high and it may pose a risk to continue charging the energy storage device further. Naturally, the level of risk associated with a situation which causes an abort of charging is ultimately determined by the predetermined value Y, thus, the higher Y is, the higher the associated risk in case of the deviation value exceeds Y.

Now an exemplary situation will be described with reference to FIG. 4. If there was, for example, a defect in a conductor of a cable causing an increased resistance in the conductors of the cable 104 arranged or configured between the inlet 102 of the vehicle and the power supply 106, a voltage drop would have occurred across the cable 104. For example, presuming an unloaded charging voltage, that is, without having started the charging of the battery, from the power supply is 230 V. In other words, in this example, the first value is 230 V in step S401. Next, charging is started S403 with a charging current of e.g. 16 A. The second value is determined S405 and may for example be 226.2 V. From the difference between the first and second values a first voltage difference may be determined S407 and may be referred to as a starting reference. Along with the known charging current an electrical resistance of the charging system is thus determined to be 0.3 Ohm ((230V−226.2V)/16 A=0.3 Ohm). After a time period of, for example 10 minutes, charging is aborted S409 and a third S411 and a fourth voltage S415 is determined in a similar manner as described above. Assuming the third voltage (with no charging) is 233 V and the fourth voltage (during charging with 16 A) is determined to be 227.9 V, a second voltage difference S417 yields an electrical resistance in the charging system of 0.32 Ohm ((233V−227.9 V)/16 A=0.32 Ohm). Thus an increase of the resistance of the charging system has occurred. An increase in electrical resistance (e.g. R2−R1) may be related to a temperature (T) increase using an empirical formula given by (R2−R1 (R1*α)=ΔT, where α is a temperature coefficient, typically in the range of $3 \times 10^{-3}$ $K^{-1}$ to $6 \times 10^{-3}$ $K^{-1}$ for metals close to room temperature (K=Kelvin). In this case (using α=0.0039 for copper) the temperature increase is 17° C. In this example, the deviation value, which may for example be given in terms of a voltage, a power (i.e. watts) or a resistance, is given as the increase in temperature derived from the difference between the first and the second voltage differences. Thus, if the temperature increase of 17° C. exceeds a first threshold value S419, a charging parameter, for example the magnitude of the charging current, may be controlled to reduce a charging current S425. If the temperature increase exceeds a second threshold value S423, charging may be aborted S429. After another given time, for example 10 minutes, the procedure may be repeated again and may again result in a determined resistance increase with reference to the first determined resistance (in this case 0.3 Ohm). If the determined deviation value (e.g. temperature, power, resistance, voltage) exceeds the first or the second predetermined value it may again be appropriate to control a charging parameter as described above.

Controlling a charging parameter may for example be related to reducing the charging current or abort charging. The temperature increase may for example be compared to the total power yielding a temperature in the charging cable. For example, if the charging cable has the appropriate dimensions for handling the charging current a temperature increase typically does not exceed 15° C. In this example, a deviation value as described in relation to FIG. 4 may be e.g. a temperature value or a resistance value. In should be noted that the above values are only for exemplary purposes and it is obvious for the skilled person to use other values than the above mentioned. For example, voltage, current, resistance, and temperature values may be any other values than the above exemplary values.

Additionally, variations to the disclosed embodiments can be understood and effected by the skilled person in practicing the disclosure, from a study of the drawings, the disclosure, and the appended claims. For example, the present disclosure is equally applicable to a charging system connected to a three-phase power supply. The described method may then be applied to all three of the connected phases. Furthermore, a charging current and/or voltage may be higher and or lower than described herein within the scope of the disclosure. The relay as described in the system may be any controllable relay suitable for the application. Furthermore, in the described examples, a voltage is measured by a control unit arranged or configured as part of a charging unit in the vehicle. However, this is not a limiting feature since the voltage may be measured by another voltage measuring means located anywhere along the electrical path from the external (or an internal) power supply to the battery of the vehicle. Furthermore, the system may further comprise additional rectifier bridges and filters, such as high-pass or low-pass filters, or converters without limiting the functionality of the system. In the method as described above, the first voltage may be used to determine a resistance starting reference to be used in subsequent voltage difference determinations.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for charging an energy storage device in a vehicle using a power supply, the method comprising:
    determining a first value indicative of a first voltage level output from the power supply;
    starting charging of the energy storage device using the power supply;
    determining a second value indicative of a second voltage level output from the power supply;
    determining a first voltage difference based on a difference between the second value and the first value;
    after a predetermined time, aborting charging;
    determining a third value indicative of a third voltage level output from the power supply;
    starting charging of the energy storage device using the power supply;
    determining a fourth value indicative of a fourth voltage level output from the power supply;
    determining a second voltage difference based on a difference between the fourth value and the third value;
    determining a deviation value based on a difference between the second voltage difference and the first voltage difference; and
    based on the deviation value, controlling a charging parameter.

2. The method according to claim 1 wherein, if the deviation value exceeds a first predetermined threshold value (X), a charging current provided from the power supply to the energy storage device is reduced.

3. The method according to claim 2 wherein the charging current provided is reduced proportionally to the deviation value.

4. The method according to claim 2 further comprising, if the deviation value exceeds a second predetermined threshold value, aborting charging of the energy storage device, wherein the second threshold value is larger than the first threshold value.

5. The method according to claim 1 further comprising determining a temperature value indicative of a temperature of a charging cable connected between the power supply and the energy storage device.

6. The method according to claim 5 wherein, if the temperature value exceeds a first predetermined threshold temperature value, a charging current provided from the power supply to the energy storage device is reduced.

7. The method according to claim 6 further comprising, if the temperature value exceeds a second predetermined temperature threshold value, aborting charging of the energy storage device, wherein the second temperature threshold value is larger than the first temperature threshold value.

8. The method according to claim 1 further comprising determining a third voltage difference value indicative a voltage between an electrical neutral lead of the power supply and an electrical ground during charging and, if the third difference exceeds a third predetermined threshold value, aborting charging of the energy storage device.

9. The method according to claim 1 wherein the predetermined time is in the range of 1-60 minutes.

10. The method according to claim 1 wherein the method is repeated at predetermined time interval.

11. A system for charging an energy storage device with an external power supply, the system comprising:
    a control unit configured to receive a current from the power supply, the control unit comprising a measuring unit for determining a value indicative of a voltage level output from the power supply; and
    a relay unit configured to receive the current from the power supply and, depending on a control signal received from the control unit, configured to control a supply of the current from the power supply to the energy storage device;
    wherein the control unit is configured to:
    in the measuring unit, determine a first value indicative of a voltage level output from the power supply;
    start charging of the energy storage device using the power supply;
    in the measuring unit, determine a second value indicative of a second voltage level output from the power supply;
    determine a first voltage difference based on a difference between the second value and the first value;
    after a predetermined time, abort charging;
    in the measuring unit, determine a third value indicative of a third voltage level output from the power supply;
    start charging of the energy storage device using the power supply;
    in the measuring unit, determine a fourth value indicative of a fourth voltage level output from the power supply;
    determine a second voltage difference based on a difference between the third value and the fourth value;
    determine a deviation value based on a difference between the first voltage difference and the second voltage difference; and
    based on the deviation value, control a charging parameter.

12. The system according to claim 11 further comprising a temperature sensor configured to determine a first temperature value indicative of a temperature of the charging cable, wherein if the first temperature value exceeds a first predetermined temperature value, the control unit is configured to reduce a charging current.

13. The system according to claim 12 wherein, if the first temperature value exceeds a second predetermined temperature value, the control unit is configured to abort charging.

14. The system according to claim 11 wherein the control unit is further configured to, if the deviation value exceeds a first predetermined threshold value, reduce a charging current provided from the power supply to the energy storage device.

15. The system according to claim 14 wherein the control unit is further configured to, if the deviation value exceeds a second predetermined threshold value, control the relay unit such that charging of the energy storage device is aborted, wherein the second threshold value is larger than the first threshold value.

* * * * *